3,484,845
CABLE CONTROL MECHANISM FOR CONTROLLING THE FLIGHT OF MODEL AIRPLANES
John H. Warner III and William W. Warner, both of 139 W. Northwood Ave., Columbus, Ohio 43201
Filed Jan. 31, 1967, Ser. No. 613,016
Int. Cl. A63h 27/04
U.S. Cl. 46—77                                                14 Claims

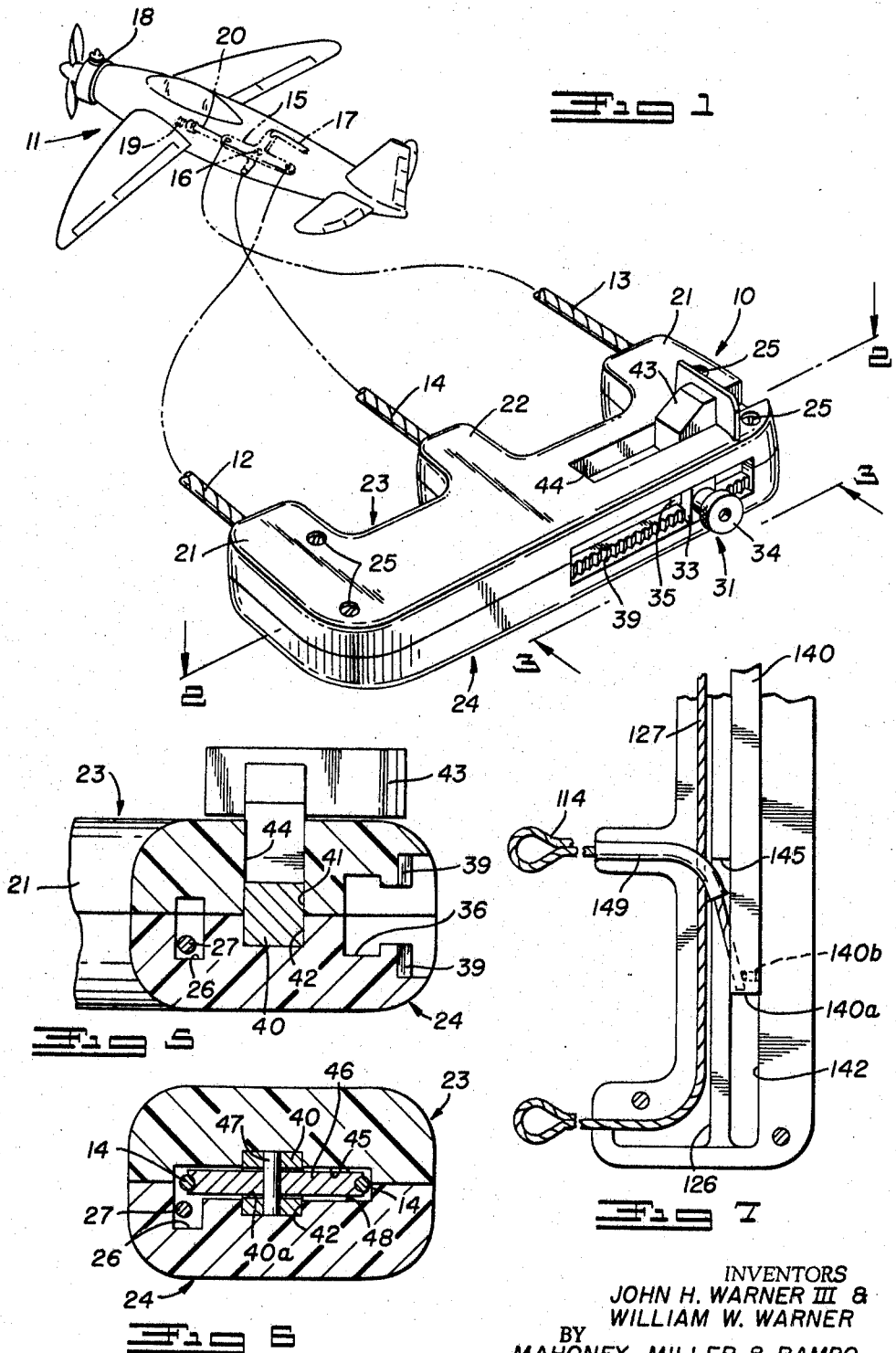

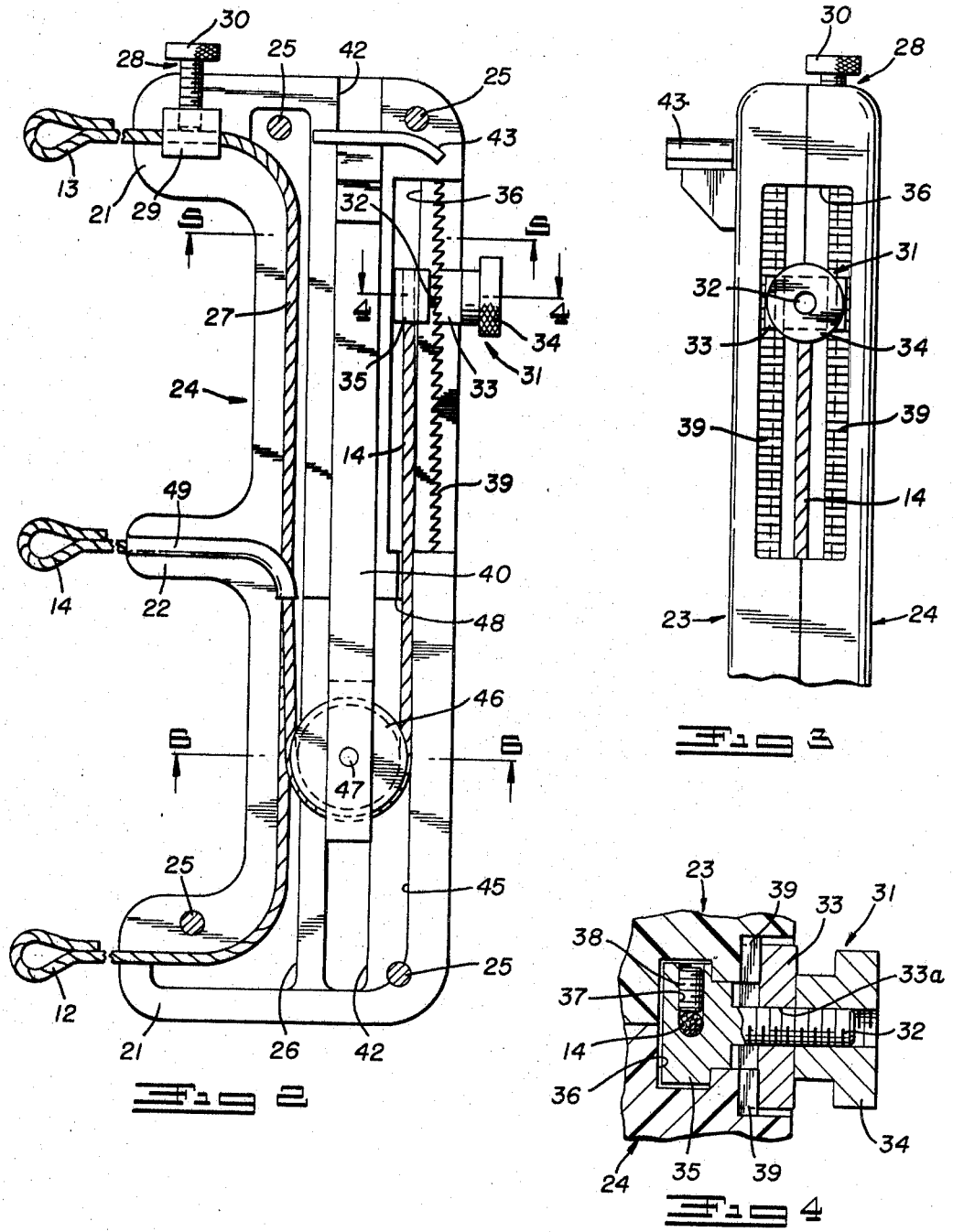

ABSTRACT OF THE DISCLOSURE

A hand-held control unit is provided for selective manipulation of three control cables in effecting control of two flight functions in a model airplane connected to the cables. This control unit is of a small compact size readily gripped within the palm of the operator's hand with the fulcrum points or points of effective connection of the cables with the unit thereby resulting in a relatively short lever arm and minimal force which must be overcome in manipulating the control cables. The points of effective connection of all three cables lie in a single plane or line and relative longitudinal displacement of one cable relative to the other two is effected by a motion translating mechanism having a thumb actuated abutment which is displaced along an axis transverse to the extended cables.

---

The basic control as applied to model airplanes is the control of the elevators for directional control in a vertical plane. This type of control may be accomplished by a lever arm pivotally supported at its center and having a cable attached to the opposite ends with the cables not only maintaining the aircraft within the flight circle but effecting desired control over the elevator through relative longitudinal displacement of the two control cables. A simple, hand-held control unit for this basic function may comprise a U-shaped handle structure that may be readily gripped by the operator's hand with the two cables extending outwardly therefrom in relatively spaced relationship and relative longitudinal displacement effected through pivotal motion of the hand. While this basic equipment accomplishes the primary objects of flight control of a model airplane, it is often desired to include or incorporate two or more control functions in the aircraft. An additional control function may be speed control of the engine which may be readily effected by appropriate operation of a slidable throttle plate that may be spring biased to a base position and is displaced by a cable attached to the throttle plate. Control of this second function, in combination with control of the elevators, is effected through relative displacement of the control cables connected to the elevator control mechanism and the control cable which is connected to the actuating mechanism of the second control function. This third cable connected to the second control function should also be attached to the hand-held control unit for convenience in effecting simultaneous control over the two control functions with any degree of accuracy.

Hand-held control units have been devised to accomplish the objective of multiple function control but the known prior art apparatus has not been found fully satisfactory. One well known hand-held control unit of the prior art is of the pistol-grip type in that the control of the second function cable relative to the first function cables is effected by manipulation of the operator's index finger while the unit is gripped in the palm of the hand. The disadvantage of control by means of an index finger is that precise control is not readily obtained and the index finger muscles are easily fatigued resulting in erratic, improper and unsafe operation. The centrifugal force developed by a model airplane of even a small size is of substantial magnitude and necessitates an opposite counter force exerted by the operator's index finger. This disadvantage is more pronounced in situations where such a hand-held control unit is utilized in controlling the larger sized model airplanes. A second disadvantage of the prior art apparatus is the relative insensitivity of the apparatus as between movement of the two control cables for the first control function and the relative movement of the cable for the second control function. As previously indicated, relative displacement of the two cables for the first control function is effected through relative rotational or pivotal movement of the operator's hand. Therefore, to avoid actuation of the second control mechanism, this cable must be maintained at a constant effective length relative to the first two cables to avoid such inadvertent operation. This is difficult to achieve with the prior art apparatus as such apparatus normally places the point of attachment of the cables to the hand-held control unit at a considerable distance to the pivotal point of the operator's hand. This forms a relatively long moment arm for both control functions requiring a relatively large degree of pivotal movement of the operator's hand to effect the desired control and often results in inadvertent simultaneous operation of both control functions. In addition, this relatively long moment arm further increases the fatigue factor in operation and a factor of particular importance in controlling the larger size model airplanes.

It is, therefore, the primary object of this invention to provide a hand-held control unit for controlling the flight of model airplanes having two control functions which is of relatively simple construction and operation and which greatly assists the operator in precisely and accurately controlling the flight path and operation of the model airplane.

It is a further object of this invention to provide a hand-held control unit permitting simultaneous control of two distinct functions which has a minimal moment arm thereby substantially reducing the effort required for controlling the model airplane.

It is another important object of this invention to provide a novel, hand-held control unit for controlling the two functions of a model airplane in which the mechanism for controlling the second function is operated through manipulation of the operator's thumb which permits prolonged operation and precise control over the function as the fatigue factor is of less consequence with respect to the operator's thumb.

It is also an object of this invention to provide a hand-held control unit for controlling the flight of model airplanes which is of simple, rugged construction and may be easily manipulated by an operator.

These and other objects and advantages of this invention will be readily apparent from the following detailed description of an embodiment thereof and the accompanying drawings.

In the drawings:

FIGURE 1 is a perspective view of a hand-held control unit embodying this invention and shown attached to the controlled mechanisms of a model airplane by cables.

FIGURE 2 is an enlarged, horizontal sectional view, taken along lines 2—2 of FIGURE 1.

FIGURE 3 is a fragmentary side elevational view taken along lines 3—3 of FIGURE 1, showing the mechanism for adjustment of the fixed cable connection.

FIGURE 4 is an enlarged transverse, sectional view of the mechanism for adjusting the fixed cable connection taken along lines 4—4 of FIGURE 2.

FIGURE 5 is an enlarged transverse, sectional view, taken along line 5—5 of FIGURE 2.

FIGURE 6 is an enlarged transverse, sectional view, taken along line 6—6 of FIGURE 2.

FIGURE 7 is a reduced scale, fragmentary sectional view similar to FIGURE 2 of a modified hand-held control unit.

Having reference to the drawings and specifically FIGURE 1, a hand-held control unit of this invention, indicated generally by the numeral 10, is shown connected to a diagrammatically illustrated model airplane 11 by the cable elements 12, 13 and 14. The cable elements 12 and 13, which may be small steel wire cables, are connected to the opposite ends of a T-shaped bell crank 15 which is pivotally supported at 15 within the structural framework of the model airplane for rotational movement about a vertical axis. An elongated control rod 17 interconnects the base of the stem of this bell crank 15 with the mechanism of the elevator. Such an elevator control mechanism is of well-known construction and is not further described or illustrated. With the cables 12 and 13 relatively fixed to the control unit 10, manipulation of the control unit 10 resulting in rotational movement in the plane of the handle will result in relative longitudinal displacement of the cable elements 12 and 13 causing the bell crank 15 to rotate about its pivot point 16 and produce longitudinal movement of the control rod 17. The centrifugal force produced remains equally distributed as to the two cable elements 12 and 13 irrespective of the relative angular position of the bell crank 15.

A second control function, which may be the operation of a throttle plate for an engine 18 to effect speed control, is effected by the third cable element 14. The throttle plate (not shown) is normally spring-biased to a base position, as by a spring 19, and which will oppose any outward directed force applied to the cable element 14. A guide tube 20, adapted to receive the cable element 14 and formed with a right-angle bend, is mounted within the airplane fuselage and operates to translate the longitudinal movement of the throttle plate to a displacement of the cable element 14 which is transverse to the longitudinal axis of the model airplane. Assuming that the airplane is in flight and the cable element 14 is of a substantially greater length than the cable elements 12 and 13, the centrifugal force exerted on the cables by the circular motion of the airplane will be solely absorbed by the cable elements 12 and 13. However, upon taking up the slack of the cable element 14 to a point where a portion of the centrifugal force will also be applied to the cable element 14 to effect a longitudinal displacement of the control cable within the airplane fuselage and thereby result in movement of the throttle plate in opposition to the biasing force of the spring 19. The degree of displacement is limited by the relative difference in the lengths of the cable element 14 and the cable elements 12 and 13. Releasing the force on the control cable element 14 will return the centrifugal force to the cable elements 12 and 13 with the spring 19 returning the throttle plate to its normally biased position. From a consideration of the separate operations of the cable elements 12 and 13 and the cable element 14, it will be readily apparent that the control functions may be simultaneously although independently actuated through appropriate manipulation of the control unit 10 to effect the necessary relative longitudinal displacement between the cable elements 12 and 13 and between the cable elements 14 and the cable elements 12 and 13 as a unit.

The hand-held control unit 10 of this invention comprises a structurally rigid housing which is of elongated form and adapted to fit within the palm of the hand and which includes an elongated, main body portion of rectangular cross section having two laterally directed end projections 21 and a laterally directed center projection 22 through which the cable elements 12, 13 and 14 enter the main body portion. The center projection 22 is of a relatively narrower configuration to more conveniently fit between the fingers of the operator's hand. The unit is gripped in the palm of the hand with two fingers extending around the main body between the center projection 22 and each respective end projection 21. The housing may be fabricated by a molding process from a suitable thermosetting plastic material having the necessary structural characteristics. When thus molded, the housing is preferably formed in two sections which may be designated the bottom and top sections 23 and 24, respectively, having several cavities and recesses which will be subsequently described.

The bottom and top housing sections 23 and 24 may be rigidly secured together by suitable fastening devices which may be of the bolt type. Four such bolt type fastening devices 25 are shown in FIGURES 1 and 2 as projecting transversely through the two sections to secure the sections in rigid relationship. The control unit 10 is shown inverted in FIGURE 1 to more clearly show the operating element of the unit. In normal operation, the control unit would be inverted with the palm of the hand lying over the flat surface of the top housing section 24 and with the fingers curled over onto the surface of the bottom housing section 23. The projections 21 and 22 are of a relatively short length and, preferably, do not extend beyond an operator's fingers to minimize the moment arm as to the effective connecting point of the cable elements.

Referring specifically to FIGURES 2, 5 and 6, an elongated slot or channel 26 may be seen formed in the top housing sections 24 and extending substantially the length thereof. The cable elements 12 and 13 preferably form a continuous cable which enters the respective end projections of the housing at right angles to the longitudinal axis of the housing with the interconnecting section designated by the numeral 27. The laterally-directed, end projections 21 are formed with the slots or recesses for receiving the cable elements 12 and 13 and which communicate with the channel 26. This channel 26 and associated recesses formed in the end projections 21 are preferably of a depth such that the cable elements 12 and 13 and the interconnecting section 27 will be displaced from the plane of the interface between the bottom and top housing sections 23 and 24, as can be best seen in FIGURES 5 and 6. Maintenance of the cable elements 12 and 13 in relatively fixed relationship to the housing section 24 is effected by a cable anchor 28. This cable anchor 28 includes a retainer block 29 fitted within a receiving socket formed in the housing section 24 in one of the end lateral projections 21 with the block 29 having a through aperture formed therein through which the cable element 13 extends. A thumb screw 30 is threaded into the block 29 and is operative to secure the cable element 13 in the retainer block 29. With the cable thus secured to the anchor 28, the anchor will prevent displacement of the cable elements 12 and 13 relative to the housing. Releasing the clamping pressure exerted by the thumb screw 30 will permit displacement of the cable elements when initially installing and adjusting the cable to assure that the cable elements 12 and 13 will be of equal length or to permit adjustment at any subsequent time.

The cable element 14, which is operative to effect actuation of the second control function mechanism, enters the housing through the center projection 22. Cable-engaging means is provided to secure an end of the cable element 14 to the housing and engage the cable element 14 to provide selective control over the extension of this cable element relative to the housing sections 23 and 24. Included in the cable-engaging means, as can be best seen by reference to FIGURES 2, 3 and 4, is a cable anchor 31. The cable anchor 31 is preferably of the type permitting selective adjustment of position of the end of the cable element 14 relative to the housing sections 23 and 24 to facilitate proper initial adjustment of the length of the cable element 14 relative to the cable elements 12 and 13 and is effective in maintaining the end of the cable element 14 in a fixed relationship to the housing. Forming the cable anchor 31, which is cooperatively engageable with the structure of the housing sections 23 and 24, is a screw-threaded bolt 32, a clamping plate having a tooth surface 33, and a thumb nut 34. The screw-threaded bolt 32 is formed with a rectangularly-shaped head 35 which is adapted to slide longitudinally of the housing sections 23 and 24 in a T-shaped slot 36 which extends longitudinally of the housing with the stem of the slot opening at the side of the housing opposite the projections 21 and 22. The head 35 of the bolt 32 is also of a T-shape, as can be best seen in FIGURE 4, with the stem adapted to fit within and slide between the narrowest portions of the T-shaped slot 36. Extending through the head 35 is an elongated bore 37 which receives the end of the cable element 14. Threaded into a transverse hole communicating with the bore 37 is a setscrew 38 which may be turned inwardly to bring the interior end thereof into engagement with the cable element 14 and thereby secure the cable element to the bolt head 35. Formed in the respective housing sections 23 and 24 along each respective longitudinal edge of the T-shaped slot 36 are recessed toothed surfaces 39 which are cooperatively engageable with the toothed surface of the clamping plate 3. The clamping plate 33 is of a width to extend across the open portion of the slot 36 and is positioned in the recesses forming the surfaces 39 to bring the surfaces thereof into mating engagement. The thumb nut 34 is then threaded onto the threaded portion of the bolt 32 which extends through an aperture 33a formed in the plate and turned to bring the toothed surfaces into clamping engagement. With the mating toothed surfaces drawn into clamping engagement, the bolt head 35 will also be drawn tightly against the opposed surface portions of the slot 36 thereby preventing disengagement of the toothed surfaces and forming a positive anchor. By loosening the thumb nut 34, the cable anchor 31 may be longitudinally displaced relative to the housing sections 23 and 24 in the slot 36 to properly position the end of the cable element for appropriate length adjustment of the cable element 14 relative to the other two cable elements 12 and 13.

In the illustrated embodiment, as can be best seen in FIGURE 2, the T-shaped slot 36 and toothed recessed surfaces 39 are formed in the respective portions of the housing sections 23 and 24 between the center projection 22 and one of the end projections 21. This location provides the maximum relative adjustment of the length of the cable element 14.

Selective adjustment of the length of the cable element 14 for actuation of the second control function is effected by operation of a longitudinally reciprocal slider 40 of the cable-engaging means. The slider 40 comprises an elongated bar of square cross section which is disposed in mating channels 41 and 42 formed in the respective housing sections 23 and 24. A thumb piece 43 is formed with the slider 40 and projects laterally therefrom through a slot 44 formed in the side wall of the bottom housing section 23 and which opens to the channel 41, as can be best seen by reference to FIGURE 1. The thumb piece 43 is movable over the surface of the housing section within a range which may be readily accommodated by the operator's thumb.

Secured to the opposite end of the slider 40 and movable longitudinally of the housing within a recess or space 45 formed in opposed surface portions of the housing sections 23 and 24 is a pulley 46 adapted to engage the cable element 14. The recess 45 extends from both sides of the channel 42. The pulley 46 is mounted on a pivot pin 47 in a slot 40a formed in the end of the slider 40. The cable element 14 is trained around the pulley 46 and it can be seen from FIGURE 2 that longitudinal displacement of the slider 40 will effect a change in the length of the cable element 14 extending from the control unit. Due to the pulley arrangement, the change in length of the cable element 14 is effected in a two-to-one ratio to the longitudinal displacement of the slider 40 which reduces the amount of thumb movement required for a specific cable displacement. The recess 45 is open at one longitudinal side and joins the channel 26 while a connecting passageway 48 connects the end of this recess with the channel 36 to accommodate the cable element 14.

A guide tube 49 adapted to receive the cable element and formed from a suitable metal is preferably positioned in a slot formed in the lateral center projection 22 to guide the cable element and to reduce the effect of frictional wear on the molded plastic of the control handle. This guide tube 49 is formed with an arcuately curved right angle bend at the interior end which is flared outwardly and guides the cable element 14 toward the recess 45.

With the thumbpiece 43 displaced toward the end of the housing, the pulley 46 will be positioned closely adjacent the end of the recess 45 where the cable element 14 emerges from the guide tube 49. In this configuration, with the cable anchor 31 at a predetermined selected position, the cable element 14 will be extended to its maximum length. The cable anchor 31 may then be positioned to properly adjust the length of extension of the cable element 14 in accordance with the length of the cable elements 12 and 13. After appropriately adjusting the cable anchor 31, the slider 40 may be displaced inwardly by application of pressure to the thumbpiece 43 causing the pulley 46 to move through the recess 45 and draw the cable element 14 inwardly. This will decrease the length of the cable 14 relative to the length of the cable elements 12 and 13 and thereby effect actuation of the respective control mechanism. The degree of actuation will be dependent on the displacement of the slider 40 produced by the operator's thumb.

A modification of a hand-held control unit embodying this invention is illustrated in FIGURE 7 in which the center cable element 114 is directly connected to the end of the slider 140. The housing is of the same external configuration as that previously described with the interconnecting cable section 127 disposed in a channel 126 and the slider 140 disposed in a channel 142. The recess 145 is modified and merely extends between the channels 126 and 142 with the guide tube 149 extending closer to the slider 140. An end of the cable element 114 is secured in a socket 140a formed in the marginal end portion of the slider by a setscrew 140b. There is no displacement multiplication in this modified structure and a unit displacement of the slider 140 will effect a unit displacement of the cable element 114.

It will be readily apparent that the hand-held control unit of this invention greatly enhances the control over the operation of model airplane having two controllable mechanisms. The control unit minimizes the moment arm of the effective point of attachment of the control cables which reduces the movement and force required to effect the control functions. Providing a slider with thumbpiece which is displaced longitudinally of the housing to effect control over one of the controlled functions further enhances the operation by providing precise, accurate control through manipulation by the operator's thumb.

Having thus described this invention, what is claimed is:

1. A hand-held control unit for controlling the flight of a model airplane having at least two independent control mechanisms controllable through relative longitudinal displacement of first control cable elements and a second control cable element connected with the respective control mechanisms and comprising a structurally rigid housing of elongated form adapted to be gripped by the operator's hand, first cable engaging means carried by said housing engageable with the first control cable elements for securing the first control cable elements to said housing in fixed relationship with the cable elements extending laterally therefrom, and second cable engaging means carried by said housing engageable with the second control cable element for securing the second cable element to said housing with the cable element extending laterally therefrom, said second cable engaging means including a slider carried by said housing in cooperative engagement therewith for reciprocal movement longitudinally of said housing in transverse relationship to said laterally extending cable elements for effecting a change in the length of extension of the second control cable element relative to the length of extension of said first cable elements through selective longitudinal displacement of said slider relative to said housing.

2. A hand-held control unit according to claim 1 wherein the first control cable elements comprise a single elongated cable having opposite end portions extending laterally from said housing and said first cable engaging means includes a cable clamp maintained in fixed relationship to said housing and releasably engageable with the first control cable elements to permit selective adjustment of the relative length of extension of said end portions from said housing.

3. A hand-held control unit according to claim 1 wherein the first control cable elements comprise a single elongated cable having opposite end portions extending laterally from said housing and said housing is formed with a channel for receiving the first control cable elements with said end portions thereof extending from said housing in longitudinally spaced relationship.

4. A hand-held control unit according to claim 3 wherein said first cable engaging means includes a cable clamp disposed across said channel in fixed relationship to said housing and being releasably engageable with the first control cable elements to permit selective adjustment of the cable elements relative to said housing.

5. A hand-held control unit according to claim 1 wherein the first control cable elements comprise a single elongated cable having opposite end portions extending laterally from said housing and said housing is formed to receive and support the first control cable elements with end portions of the cable elements extending laterally from said housing in longitudinally spaced relationship and disposed equidistantly from a center support point of said housing and to receive and support the second control cable element centrally of the spaced apart first control cable elements at said center support point.

6. A hand-held control unit according to claim 1 wherein said slider is formed with a thumbpiece projecting a distance outwardly from said housing for engagement by the operator's thumb in effecting longitudinal displacement thereof.

7. A hand-held control unit according to claim 1 wherein said housing includes fixed cable guide means through which the second control cable passes and said slider comprises an elongated bar to which an end of the second control cable element is attached, said housing being formed with guide means for receiving said slider for reciprocating movement relative to said guide means whereby reciprocating movement of said slider will effect a change in the length of extension of the second control cable element relative to said housing at the opposite side of said guide means.

8. A hand-held control unit according to claim 1 wherein said second cable engaging means includes a cable clamp engageable with the second control cable element and operable to secure one end of the second cable element to said housing in relatively fixed relationship.

9. A hand-held control unit according to claim 8 wherein said cable clamp is movable longitudinally relative to said housing to a selected fixed position to thereby permit adjustment of the effective length of the second control cable element.

10. A hand-held control unit according to claim 9 wherein said housing is formed with a longitudinally extending, toothed surface portion and said cable clamp includes a clamping plate formed with a surface having cooperatively shaped teeth whereby said cable clamp may be secured in a selected position relative to said housing through intermeshing engagement of said toothed surfaces.

11. A hand-held control unit according to claim 1 wherein one end of the second control cable element is adapted to be secured to said housing in fixed relationship and said housing is provided with fixed cable guide means through which the second control cable element is longitudinally displaceable with said slider comprising an elongated bar and said housing being formed with guide means for cooperatively receiving said slider for longitudinal reciprocating movement relative to said housing, said slider being engageable with the second control cable element at a point intermediate the point of attachment of the cable element end to said housing and said fixed cable guide means whereby longitudinal movement of said slider effects a change in the length of extension of the second control cable element.

12. A hand-held control unit according to claim 11 wherein said slider is provided with a cable engaging pulley.

13. A hand-held control unit according to claim 1 wherein said housing is of elongated bar form adapted to be gripped within the palm of the hand and said housing is provided with laterally directed projections along one side of said housing from which the control cable elements extend, said projections being of a length which is of the order of the thickness of the operator's fingers.

14. A hand-held control unit according to claim 13 wherein said slider is formed with a thumbpiece which projects a distance outwardly from a side surface of said housing in orthogonal relationship to side of said housing from which said projections extend for engagement by the operator's thumb in effecting longitudinal displacement thereof.

References Cited

UNITED STATES PATENTS

| | | | |
|---|---|---|---|
| 2,292,416 | 8/1942 | Walker | 46—77 |
| 2,543,965 | 3/1951 | Hamilton | 46—77 |
| 2,765,128 | 10/1956 | Barth | 46—77 X |
| 3,058,260 | 10/1962 | Sanborn | 46—77 |

ANTONIO F. GUIDA, Primary Examiner

C. R. WENTZEL, Assistant Examiner